United States Patent
Melton et al.

(10) Patent No.: US 6,857,645 B2
(45) Date of Patent: Feb. 22, 2005

(54) SUSPENSION SEAT AND AXLE COUPLING

(75) Inventors: Patrick B. Melton, Horseshoe, NC (US); Jack Darrin Oates, Fletcher, NC (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 65 days.

(21) Appl. No.: 10/139,989

(22) Filed: May 7, 2002

(65) Prior Publication Data

US 2003/0209871 A1 Nov. 13, 2003

(51) Int. Cl.$^7$ .................................................. B60G 9/02
(52) U.S. Cl. ............................................. 280/124.116
(58) Field of Search ...................... 280/124.116, 124.17, 280/124.175

(56) References Cited

U.S. PATENT DOCUMENTS

| | | | | |
|---|---|---|---|---|
| 3,386,724 A | * | 6/1968 | Tantlinger | 267/52 |
| 3,547,215 A | * | 12/1970 | Bird | 280/86.75 |
| 3,630,541 A | * | 12/1971 | Carlson et al. | 280/124.116 |
| 3,785,673 A | * | 1/1974 | Harbers et al. | 280/124.101 |
| 3,913,937 A | * | 10/1975 | Longworth et al. | 280/680 |
| 4,033,606 A | * | 7/1977 | Ward et al. | 280/682 |
| 4,465,298 A | * | 8/1984 | Raidel, Sr. | 280/124.116 |
| 4,541,653 A | * | 9/1985 | Raidel | 280/124.109 |
| 4,693,486 A | * | 9/1987 | Pierce et al. | 280/80.1 |
| 4,705,294 A | * | 11/1987 | Raidel | 280/124.116 |
| 4,858,949 A | * | 8/1989 | Wallace et al. | 280/124.116 |
| 5,078,420 A | * | 1/1992 | Jable et al. | 280/680 |
| 5,328,159 A | * | 7/1994 | Kaufman et al. | 267/52 |
| 6,015,158 A | * | 1/2000 | Overby | 280/11.225 |
| 6,032,967 A | * | 3/2000 | Ogoniek | 280/124.175 |
| 6,241,266 B1 | * | 6/2001 | Smith et al. | 280/124.116 |
| 6,244,613 B1 | * | 6/2001 | Renger | 280/440 |
| 6,264,231 B1 | * | 7/2001 | Scully | 280/680 |
| 2001/0017451 A1 | * | 8/2001 | Smith et al. | 280/124.116 |
| 2002/0074762 A1 | * | 6/2002 | Auerbach et al. | 280/124.164 |

* cited by examiner

Primary Examiner—Teri P. Luu
Assistant Examiner—Jordan Lofdahl
(74) Attorney, Agent, or Firm—Carlson, Gaskey & Olds, PC

(57) ABSTRACT

A suspension assembly is provided that includes a first suspension member such as a rear axle housing having first and second opposing sides. The housing includes spaced apart corners. First and second seats are respectively adjacent to the first and second opposing sides. Each of the seats has inwardly facing surfaces interconnected by an intermediate surface with the inwardly facing surfaces engaging the corners and the intermediate surface spaced from the side. The intermediate surface and inwardly facing surfaces of each seat form a continuous unbroken surface with the inwardly facing surfaces facing one another. A fastener such as a U-bolt or a pair of bolts secure the first and second seat about the first suspension member to secure a second suspension member to the first suspension member.

12 Claims, 1 Drawing Sheet

SUSPENSION SEAT AND AXLE COUPLING

BACKGROUND OF THE INVENTION

This invention relates to a connection device for a suspension assembly, and more particularly, the invention relates to an improved suspension seat and axle arrangement for securing suspension components to an axle.

Suspension seats are used to clamp suspension components together such as for clamping suspension spring brackets to a rear axle housing. Typically, a pair of seats are arranged on either side of the housing and a U-bolt is used to secure and clamp the seats about the housing. The clamps frequently loosen over time, which may damage the axle housing and related suspension components unless the fasteners are tightened.

One solution to the above problem has been to weld the seats to the housing. However, welding is a rather expensive process and the weld may break. Another solution has been to utilize locating features between the seats and the axle housing to ensure that the axle and seats do not move relative to one another in the event that the clamps loosen. The locating features add cost to the suspension assembly and may require a weld or costly feature be added to the axle housing. Finally, a design has been proposed to concentrate the clamping forces in the corners of the axle housing to introduce compressive forces in the sides of the housing. However, the seat assembly is rather expensive and utilizes five separate components to form the seat. Furthermore, the seat components engage the sides of the housing which tends to introduce clamping forces only in the vertical direction similar to the prior art. The lower seat had utilized angled surfaces that engage a pair of intermediate lower seat portions that are in contact with the corners and portions of sides of the housing. Therefore, what is needed is a more cost effective seat assembly that creates compressive forces in the vertical and horizontal sides of the housing.

SUMMARY OF THE INVENTION AND ADVANTAGES

The invention relates to a suspension assembly including a first suspension member such as a rear axle housing having first and second opposing sides. The housing includes spaced apart corners. First and second seats are respectively adjacent to the first and second opposing sides. Each of the seats has inwardly facing surfaces interconnected by an intermediate surface with the inwardly facing surfaces engaging the corners and the intermediate surface spaced from the side. The intermediate surface and inwardly facing surfaces of each seat form a continuous unbroken surface with the inwardly facing surfaces facing one another. A fastener such as a U-bolt or a pair of bolts secure the first and second seat about the first suspension member to secure a second suspension member to the first suspension member.

Accordingly, the above invention provides a more cost effective seat assembly that creates compressive forces in the vertical and horizontal sides of the housing.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
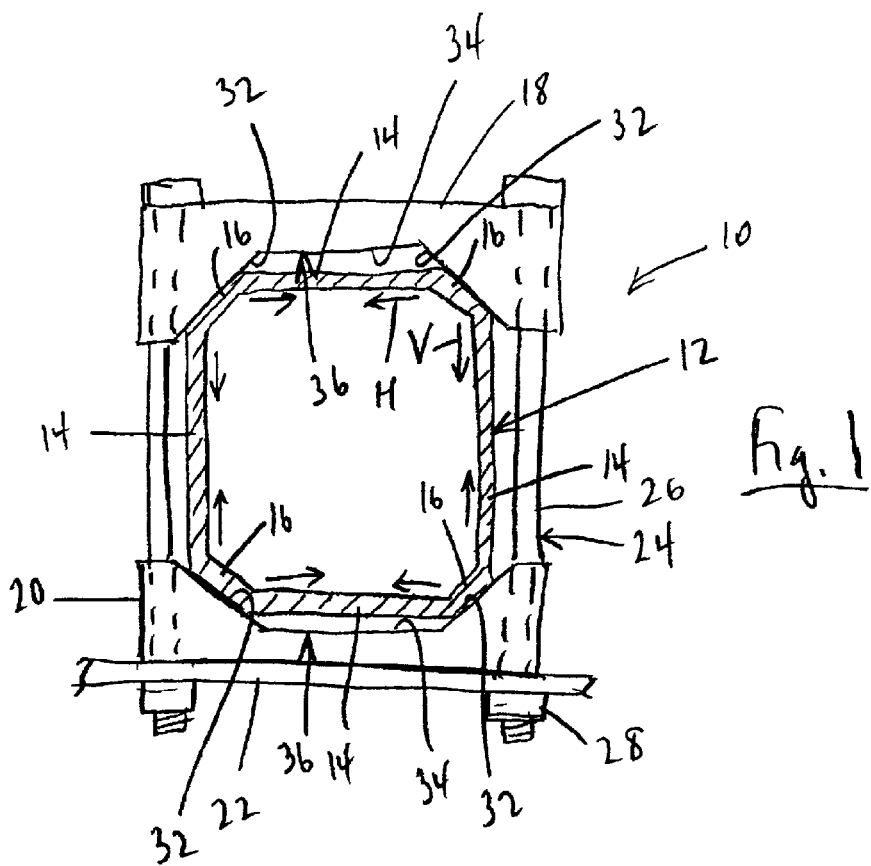
FIG. 1 is a cross-sectional view of the present invention suspension assembly seats.
Figure 2:
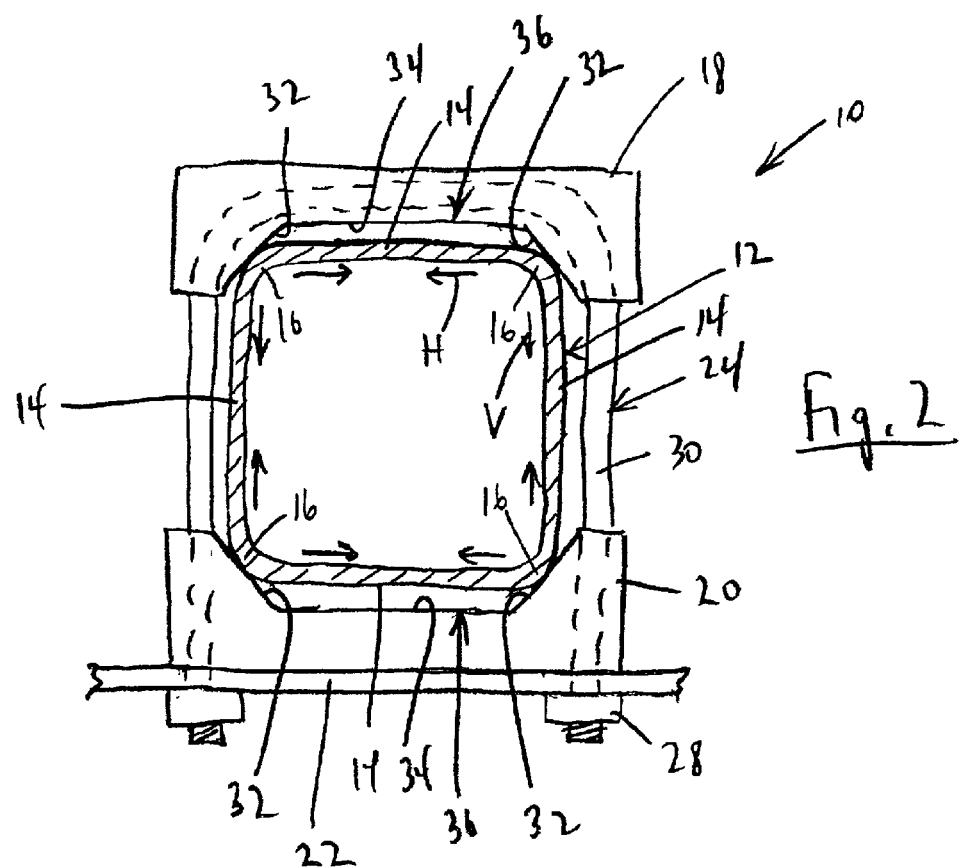
FIG. 2 is another cross-sectional view of the present invention suspension assembly seats.

A suspension assembly 10 is shown in FIGS. 1 and 2. The suspension assembly includes a first suspension member 12 that is preferably a generally quadrilateral longitudinal member such as an axle housing. The first suspension member 12 may include a pair of vertical and horizontal sides 14 with corners 16 interconnecting the sides 14. First and second seats 18 and 20 are arranged opposite one another adjacent opposing sides 14. A fastener assembly 24 is used to clamp the first and second seats 18 and 20 about the first suspension member 12 to secure a second suspension member 22 such as an attaching bracket for a suspension spring. The fastener assembly 24 may be a pair of bolts 26 and nuts 28 as shown in FIG. 1 or a U-bolt 30 and nuts 28 as shown in FIG. 2.

Typically, prior art seat assemblies introduce compressive forces in only the vertical sides of the axle. As a result, the seats are more susceptible to becoming loose over time. To address this, some prior art devices have utilized a multi-piece seat assembly to introduce compressive forces in the horizontal sides in addition to the vertical sides. However, the seat assembly does not isolate the clamping force to the corners of the axle housing so that virtually all of the compressive force is concentrated in the vertical sides as is the prior art. To this end, the present invention first and second seats 18 and 20 engage the corner 16 to introduce vertical V and horizontal H compressive forces in the sides 14 of the first suspension member 12.

The first and second seats 18 and 20 include inwardly facing surfaces 32 with an intermediate surface 34 interconnecting the inwardly facing surfaces 32 to form a continuous unbroken surface 36. That is, the first and second seats 18 and 20 each are a unitary structure that include a pair of inwardly facing surfaces 32 that face one another. The inwardly facing surfaces 32 engage the corners 16. For the embodiment shown in FIG. 1, the corners may be defined by a flat, and the inwardly facing surfaces 32 may also be flat to better rotationally fix the first and second seats 18 and 20 relative to the first suspension member 12. The intermediate surface 34 is spaced from the side 14. A more conventional first suspension member 12 is shown in FIG. 2. The corners 16 of the first suspension member 12 each have a radius. The inwardly facing surfaces 32 may be of an angle that is more resistant to permitting relative movement of the first and second seats 18 and 20 relative to the first suspension member 12. It is to be understood, that the inwardly facing surfaces 32 and intermediate surface 34 may be of a shape other than those shown in FIGS. 1 and 2.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension assembly comprising:

a first suspension member having first and second opposing sides each having spaced apart corners;

first and second seats respectively adjacent said first and second opposing sides, each of said seats having inwardly facing surfaces interconnected by an intermediate surface, with said inwardly facing surfaces engaging said corners and said intermediate surface spaced from said sides, wherein said inwardly facing surfaces and said intermediate surface of each seat form a continuous unbroken surface; and at least one threaded fastener removably securing said first and second seats about said first suspension member to secure a second suspension member to said first suspension member.

2. The assembly according to claim 1, wherein said first suspension member is a generally quadrilateral longitudinal tubular member.

3. The assembly according to claim 2, wherein said inwardly facing surfaces generate horizontal and vertical compressive forces in said tubular member.

4. The assembly according to claim 2, wherein said first suspension member is an axle.

5. A suspension assembly comprising:

a first suspension member having first and second opposing sides each having spaced apart corners;

first and second seats respectively adjacent said first and second opposing sides, each of said seats having inwardly facing surfaces which are generally planar and interconnected by an intermediate surface, with said inwardly facing surfaces engaging said corners and said intermediate surface spaced from said sides, wherein said first suspension member includes four sides with each corner adjoining two of said four sides, said inwardly facing surfaces spaced from said sides; and at least one fastener securing said first and second seats about said first suspension member to secure a second suspension member to said first suspension member.

6. The assembly according to claim 1, wherein said at least one threaded fastener is a U-bolt and a pair of nuts.

7. A suspension assembly comprising:

a first suspension member having first and second opposing sides each having spaced apart corners;

first and second seats respectively adjacent said first and second opposing sides, each of said seats having inwardly facing surfaces interconnected by an intermediate surface, with said inwardly facing surfaces engaging said corners and said intermediate surface spaced from said sides, wherein said corners are defined by a flat and said inwardly facing surfaces are flat; and at least one threaded fastener removably securing said first and second seats about said first suspension member to secure a second suspension member to said first suspension member.

8. A suspension assembly comprising:

a first suspension member having first and second opposing sides each having spaced apart corners;

first and second seats respectively adjacent said first and second opposing sides, each of said seats having inwardly facing surfaces interconnected by an intermediate surface, with said inwardly facing surfaces engaging said corners and said intermediate surface spaced from said sides, wherein said first suspension member includes four sides with each corner adjoining two of the said four sides, said inwardly facing surfaces being spaced from said sides, wherein said inwardly facing surfaces and said intermediate surface of each seat form a continuous unbroken surface; and at least one fastener securing said first and second seats about said first suspension member to secure a second suspension member to said first suspension member.

9. The assembly according to claim 8, wherein said inwardly facing surfaces of each seat face one another.

10. The assembly according to claim 5, wherein said corners are each defined by a radius and said inwardly facing surfaces engage said radii, said sides provided by flat walls extending between said corners.

11. The assembly according to claim 5, wherein said corners are provided by flats, and are generally parallel to a corresponding one of said inwardly facing surfaces.

12. A suspension assembly comprising:

a first suspension member having first and second opposing sides each having spaced apart corners;

first and second seats respectively adjacent said first and second opposing sides, each of said seats having inwardly facing surfaces interconnected by an intermediate surface, and said inwardly facing surfaces engaging said corners and said intermediate surface spaced from said sides, wherein said first suspension member includes four sides with each corner adjoining two of said four sides, said inwardly facing surfaces extending beyond said corners and beyond a plane provided by each of said adjoining two of said four sides, such that said inwardly facing surfaces are spaced from said adjoining two of said four sides; and at least one fastener securing said first and second seats about said first suspension member to secure a second suspension member to said first suspension member.

* * * * *